United States Patent [19]

De Clerck

[11] Patent Number: 4,948,031

[45] Date of Patent: Aug. 14, 1990

[54] PROCESS FOR BONDING ALUMINUM WITH CADMIUM AND PRODUCT THEREOF

[75] Inventor: Charles E. De Clerck, Great River, N.Y.

[73] Assignee: Hazeltine Corporation, Greenlawn, N.Y.

[21] Appl. No.: 147,021

[22] Filed: Jan. 19, 1988

Related U.S. Application Data

[63] Continuation of Ser. No. 928,425, Nov. 10, 1986, abandoned.

[51] Int. Cl.$^5$ .......................... B23K 35/26; H01P 1/00
[52] U.S. Cl. ...................................... 228/194; 228/208; 228/209; 228/238; 228/263.17; 29/600; 333/248; 343/786
[58] Field of Search .................... 228/263.17, 226, 183, 228/194, 198–200, 206–210, 221, 238, 157, 172; 29/600; 333/248; 343/786

[56] References Cited

U.S. PATENT DOCUMENTS

| | | |
|---|---|---|
| 2,335,615 | 11/1943 | Strasser . |
| 2,781,577 | 2/1957 | Smellie ........................... 228/263.17 |
| 3,045,330 | 7/1962 | Johnson et al. . |
| 3,061,527 | 10/1962 | Karner et al. ........................ 228/209 |
| 3,148,952 | 9/1964 | Foerster et al. ................. 228/263.17 |
| 3,180,022 | 4/1965 | Briggs et al. ......................... 228/194 |
| 3,392,442 | 7/1968 | Napier et al. ........................ 228/254 |
| 3,457,630 | 7/1969 | Schwartz et al. . |
| 3,648,357 | 3/1972 | Green, Jr. ............................ 228/254 |
| 3,703,763 | 11/1972 | Berry . |
| 3,917,151 | 11/1975 | Robinson ............................ 228/217 |
| 3,937,387 | 2/1976 | Fletcher et al. ..................... 228/206 |
| 3,969,110 | 7/1976 | Plegat .................................. 228/207 |
| 3,969,110 | 7/1976 | Plegat . |
| 3,986,255 | 10/1976 | Mandal ............................... 228/226 |
| 3,993,238 | 11/1976 | Brook et al. . |
| 4,121,750 | 10/1978 | Schoer et al. . |
| 4,727,633 | 3/1988 | Herrick .............................. 228/122 |

FOREIGN PATENT DOCUMENTS

| | | | |
|---|---|---|---|
| 0030890 | 6/1981 | European Pat. Off. ............ 228/183 |
| 121209 | 10/1984 | European Pat. Off. ....... 228/263.17 |
| 24414 | 2/1980 | Japan .................................... 228/226 |
| 1258061 | 12/1971 | United Kingdom ................ 228/183 |
| 1421958 | 1/1976 | United Kingdom ........... 228/263.17 |

OTHER PUBLICATIONS

Schwartz, Mel M., "Fluxless Brazing Aluminum Alloys", Modern Metals, pp. 81, 82, 84, 86, May 1969.
Metals Handbook, Ninth Edition, vol. 6, "Other Solder Alloys" and "Base and Coated Metal Solderability" pp. 1072–1076, copy 1983.
Metals Handbook, vol. 8, 8th Edition, pp. 258, 265, and 287, 1973.
"Aluminum Soldering", The Engineering Foundation, Welding Research Committee, pp. 313—321, Supplement to the Journal of the American Welding Society, Sep. 1940.

Primary Examiner—Nicholas P. Godici
Assistant Examiner—Samuel M. Heinrich
Attorney, Agent, or Firm—Brumbaugh, Graves, Donohue & Raymond

[57] ABSTRACT

A process for joining first and second aluminum sheets in which the bonding surfaces of the aluminum sheets have their aluminum oxide layer replaced by a zinc layer and the zinc layers are plated with a non-alloy metal bonding material such as cadmium. The first and second aluminum sheets are then assembled and fastened together with an engaging means for holding the sheets together, and then the assembled sheets are placed in a vacuum. The sheets are subsequently heated in the vacuum thereby creating a bond of cadmium between them, removed from the vacuum, and then passivated.

16 Claims, 1 Drawing Sheet

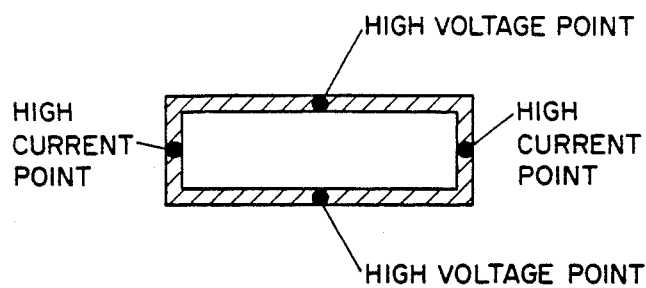
FIG. 1
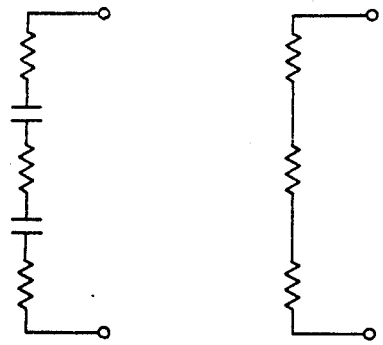
FIG. 2
(PRIOR ART)
FIG. 3
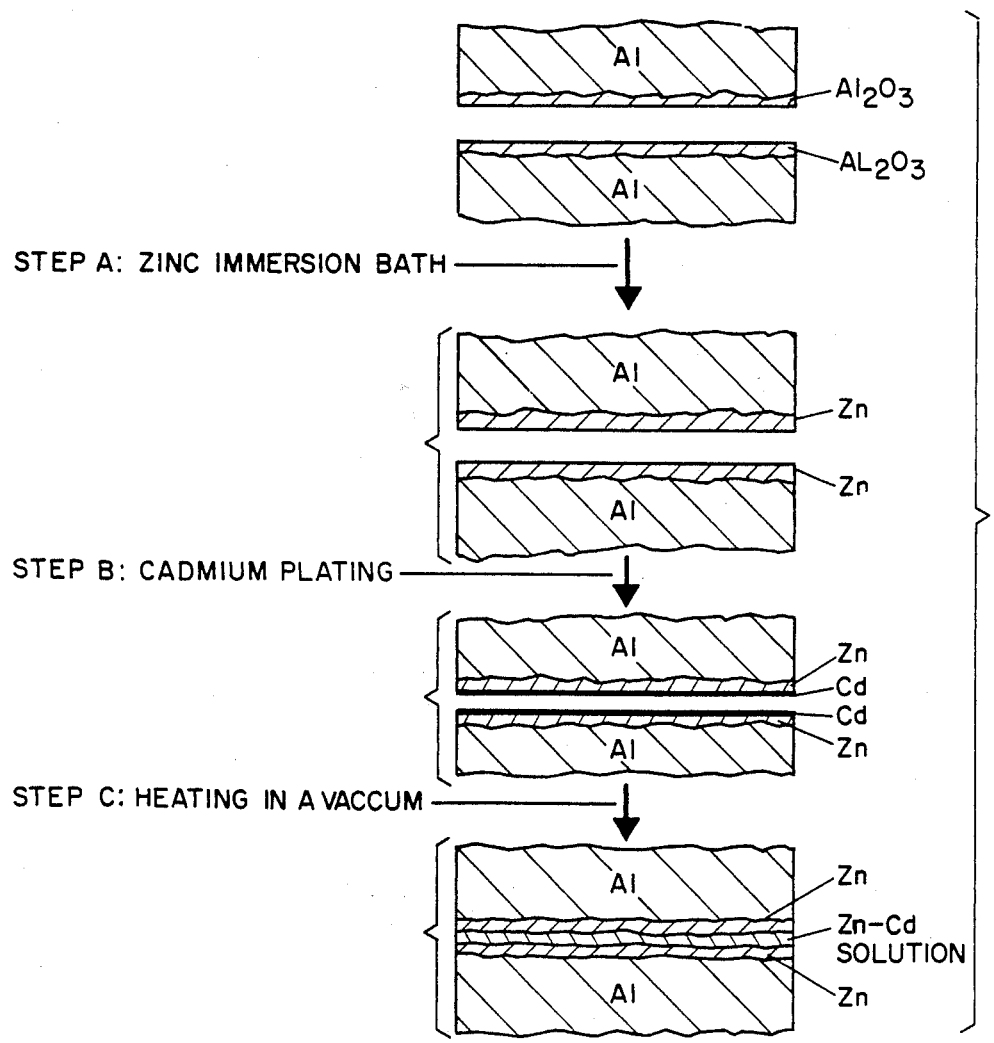
FIG. 4

PROCESS FOR BONDING ALUMINUM WITH CADMIUM AND PRODUCT THEREOF

This application is a continuation of application Ser. No. 928,425, filed on 11/10/86, now abandoned.

BACKGROUND OF THE INVENTION

1. Field of the Invention

This invention relates generally to a process for bonding aluminum by a metal reflow process in a vacuum, and more particularly, to the use of cadmium as the bonding material.

2. Description of the Prior Art

Processes and methods for brazing, diffusion bonding and soldering are widely used to join aluminum alloy members. Furthermore, solder or brazing alloys and fluxes are chosen to accomplish this goal. Such processes or methods usually comprise providing on at least one mating surface a layer of the specific bonding material, putting the mating surfaces in contact, and applying the particular procedure which results in joining the members.

For example, one such method chosen by prior art is a eutectic diffusion bonding method such as disclosed in U.S. Pat. No. 3,180,022, incorporated herein by reference. By this method, bonding appears to take place by formation of a eutectic between the aluminum surfaces and the bonding material, which after eutectic formation diffuses away from the interface to leave an extremely fine juncture line. The bonding materials used in this method are copper, gold, silver, tin or zinc.

Another example is a vacuum brazing process such as disclosed in U.S. Pat. No. 3,197,151, incorporated herein by reference. This process comprises subjecting the aluminum members to be joined to the action of a reactive metal vapor in a high temperature, low pressure environment, where the brazing alloy is disposed between the surfaces to be joined. In the vacuum brazing of aluminum products, magnesium vapor has been used as the gettering agent.

Finally, cadmium-containing alloys have been used for soldering aluminum members. See for example U.S. Pat. No. 3,969,110, incorporated herein by reference.

The prior art, as exemplified above, describes processes and methods that are designed in accordance with the physical properties of aluminum, i.e., to achieve joints that have as high a shear strength as possible, while attempting also to reduce the corrosion rate. In particular, aluminum alloys have found application as a bonding agent in the fabrication of aluminum for radiator panels for use in orbiting satellites, and for high temperature reactors.

A basic problem in bonding aluminum sheets results from the oxide layer which covers the sheets. During rolling and processing of the aluminum sheets, the aluminum oxide outer layer and other impurities such as hydrocarbons, become imbedded in the sheets. This imbedded layer generally has a constant thickness and has different electrical properties than aluminum. In general, this layer is not chemically compatible with diffusion processes.

This imbedded layer (Beilby layer) presents an electrical problem when aluminum is used as a high frequency (600 MHz) waveguide. At high frequencies, the radiation penetration depth tends to be less than 0.0010. The layer is generally greater than 0.0010 inches in thickness so that at high frequencies the radiation does not penetrate past the layer.

As a result the layer must be removed to promote bonding, to improve electrical conductivity and to reduce electrical noise. The prior art technique of copper plating the oxide layer and bonding together the plated layers does not solve this problem for high frequency applications.

FIG. 1 illustrates a rectangular waveguide. Such waveguides are generally constructed of two halves joined at or near the high current point. FIG. 2 illustrates an equivalent circuit for a seam between the high voltage points. Capacitance C1 and C2 results from the different electrical properties of the aluminum, aluminum oxide and the bonding copper layer. Sensitive, high frequency antennas should have a sufficient magnification factor (Q) in order to be able to detect background noise. Capacitance C1 and C2 cause a reduced Q and, therefore, an unacceptable Q factor results.

SUMMARY OF THE INVENTION

It is an object of the present invention to provide a process for joining aluminum members. It is another object of the present invention to provide a process for electroplating aluminum using a non-alloy metal as the bonding material.

It is another object of the invention to provide a bonding process that is compatible with the electrical properties of aluminum.

Still another object of the present invention is to minimize or completely remove the presence of the aluminum oxide layer at joint interfaces thereby improving the conductivity in the bonding area of aluminum members and lowering the electrical noise and corrosion rate. This produces a metallurgical bond between the boding material and the aluminum members.

A further object of the present invention is to provide bonded aluminum members that can be fabricated into the components or devices for transmitting and receiving.

A still further object of the present invention is to provide a process that has particular application in the fabrication of waveguide and microwave-waveguide antennas.

The above and other objects of the present invention will become apparent from the description given herein and the appended claims.

In one embodiment of the invention, the above objects are realized by a process for joining first and second aluminum sheets in which the bonding surfaces of the aluminum sheets have their aluminum oxide layer replaced by a zinc layer and the zinc layers are plated with a non-alloy metal bonding material such as cadmium. The first and second aluminum sheets are then assembled and fastened together with an engaging means for holding the sheets together, and then the assembled sheets are placed in a vacuum. The sheets are subsequently heated in the vacuum thereby creating a bond of cadmium between them, removed from the vacuum, and then passivated. The invention also includes the product resulting from this process.

In another embodiment of the invention, a process is provided for bonding two aluminum sheets. The interface of the mating surfaces must be free of aluminum oxide. This process comprises the steps of providing a layer of cadmium between the zinc-coated mating surfaces of the two aluminum sheets, assembling said sheets by contacting the mating surfaces with the layer of cadmium therebetween, and heating the resulting assembled sheets in a vacuum thereby directly bonding the aluminum sheets together with cadmium as the bonding material. The invention also includes the product resulting from this process.

In a third embodiment of the present invention, the above objects are realized by an article of manufacture comprising both first and second zinc-coated aluminum sheets, and a non-alloy cadmium bonding material that is located between the zinc coatings and bonded to each of the zinc coatings whereby the sheets are directly bonded together with the cadmium as the bonding material.

BRIEF DESCRIPTION OF THE DRAWINGS

FIG. 1 illustrates a cross sectional view of a rectangular waveguide.

FIG. 2 is a schematic diagram of the equivalent circuit of a waveguide as shown in FIG. 1 constructed in accordance with the prior art.

FIG. 3 is a schematic diagram of the equivalent circuit of a waveguide as shown in FIG. 1 constructed in accordance with the inventor.

FIG. 4 illustrates the process according to the invention.

For a better understanding of the present invention, together with other and further objects, reference is made to the following description, taken in conjunction with the accompanying drawings, and its scope will be pointed out in the appended claims.

DESCRIPTION OF THE PREFERRED EMBODIMENTS

As used herein, the term plating and variations thereof is intended to refer to any process by which one metal may be covered with an adherent layer of another metal, mechanistically, chemically, or electrically. Accordingly, as used herein, plating may refer to electroplating.

As also used herein, the term bonding and variations thereof is intended to mean a fixed amalgamation of the metals under consideration wherein such amalgamation is produced by suitable temperatures, with the application of low pressure in a vacuum chamber. Accordingly, as used herein, bonding may refer to diffusion bonding.

The present invention is applicable to the bonding (alloying) of aluminum alloy parts and surfaces. One product of the process is directed toward but not limited to fabrication into components of the microwave waveguide such as shown in FIG. 1. Some conditions should be considered in selecting sheets for waveguides. Firstly, the conductivity of the sheets is important because an antenna's capability to radiate waves into space or receive them from space is directly proportional to the conductivity of the material of which the antenna is made. Metals in general, and aluminums particularly, are good conductors in the solid state. Electrical current is carried by electrons moving through the metal under the influence of an external electric field.

Secondly, the surface finish and oxide coating in the waveguide should be considered with respect to the frequency of signal being transmitted within the waveguide. The depth of current penetration into the aluminum surface is inversely proportional to the square root of the frequency. Therefore, at higher frequencies the current may penetrate only as deep as the oxide coating that is on the aluminum surface. The conductivity of this oxide coating should be considered because it influences the loss of power experienced by the wave in propagating through the waveguide. In addition, the aluminum surface should be smooth because loss of signal is also inversely related to smoothness.

Finally, the sheets should be chemically compatible with the process. An examination of metallic bonding in general, and aluminum bonding specifically, offers an obvious explanation of the high electrical conductivity of metals and their ability to lose electrons readily when they react with non metals. The metallic lattice can be pictured as a regular array of positive ions (i.e., metal atoms minus their valence electrons) anchored in position, while the electrons are mobile. The valence electrons are able to wander through the lattice. High thermal conductivity results because heat is transferred through the aluminum by collisions between electrons which occur frequently. The strength of the metallic bond is directly related to the charge of the positive ions that occupy lattice positions. Therefore, the lattice energy of aluminum alloys is greater than that of many metals because we are dealing with +3 ions and 3 electrons per cation rather than one or two.

Aluminum alloys 5005-H34 or 1100-414 may be used as the sheets because they have a long life expentancy. Alloy 5005-H34 has a conductivity of 52% of copper using commercial bronze 220 with a conductivity of 48% of copper as a base. Alloy 1100-414 may be a better choice because it is approximately 13% better in volume conductivity and resistivity and it is essentially pure aluminum.

Preparing the aluminum containing surfaces or parts for bonding consists of remachining the aluminum sheets. Premachining is preferred for several reasons. First, the Beilby Layer must be removed. The Beilby layer is a contaminant which results from the aluminum rolling process. It is important to remove the Beilby layer because contamination would interfere with diffusion in the bonding process and thereby decrease the strength of the bond and the electrical conductivity of the bond area. Equally important, the material sheets should be selected so that mating pairs come from close proximity in the same sheet. The grain should be oriented so that it runs in the same direction in both mating sheets. This will insure that the temperature coefficient of expansion will be consistent in all directions.

Cadmium plating is provided externally on the aluminum sheets in preparation for bonding as well. The joining material should be applied external to the waveguide because wetting of the aluminum base material by the joining material should be controlled in order to achieve greatest conductivity in the product of the process. To effect this end, the natural oxide on the aluminum in the guide area prevents the migration of the joining material to the interior of the waveguide when joining is taking place.

Cadmium is chosen as the bonding material because of the following conditions of alloying (bonding). For a low temperature bonding approach the selection of bonding material is limited to cadmium (320.9), tin (231.9), lead (327.4) and zinc (419.4), because each has a melting point at or below the annealing temperature of the aluminum during the plating to avoid deforming the aluminum during bonding. The selection is further limited to cadmium and zinc when we consider the metals from a galvanic standpoint. Cadmium and zinc are most compatible with aluminum because the corrosion rate of the bond is lower than if other metals were used. Finally, cadmium becomes the material of choice because it has the lower melting temperature, and because it has good compatibility with aluminum when considering the coefficient of thermal expansion lattice constants, closest approach of atoms, and crystal structure of these elements. Low temperatures are necessary to avoid mechanical distortion. However, zinc may be used and should not be forgotten as a second choice because of its increase on the life of the product. Its higher melting point puts added load on the vacuum equipment. Metals such as copper, gold, and silver are not considered as the bonding material if they can be applied to aluminum directly. However, this becomes difficult because an oxide barrier layer may form and cause separation between the aluminum and the bonding material.

The plating first starts with replacing the aluminum oxide layer with a zinc layer by use of a caustic dip in an alkaline zincate solution followed by a zinc immersion bath that consists of: 450 g/l NaOH, 90 g/l ZnO. The zinc deposit should be approximately 0.2 mg/in$^2$. This step is illustrated in FIG. 4 as step A.

The zinc immersion process of the present invention dissolves and removes the oxide film that is present on the aluminum surface of the sheets. When any underlying aluminum is exposed, it too begins to dissolve, and is replaced by an equivalent weight of zinc. Action in the alkaline zincate solution continues until the aluminum surface is completely covered. After the zinc immersion, the plating process is carried out.

The zinc layer is then cadmium plated as illustrated in FIG. 4 as step B. The cadmium plating must be between $4 \times 10^{-4}$ in. and $5 \times 10^{-4}$ in. thick. First, the minimum is necessary to minimize porosity and insure an aluminum surface free from oxides. Secondly, the maximum prevents excessive spill-over during alloying which is important because spillover can decreases the conductivity of the product.

Machining may then be done to remove plating in areas where it is not wanted. In the machining operation, care must be taken to prevent any damage to the plated areas that remain after machining. The machining operation should leave the work burr free to create a smooth, even bond. The parts must be thoroughly cleaned as well to avoid contamination.

The joining process is accomplished by heating (step C, FIG. 4) at or slightly above the annealing temperature of the aluminum base material, 345° C. This leaves the base material in the annealed condition, where electrical volume conductivity is highest. As previously explained, conductivity is important in antennas, and, particularly, waveguides. The zinc and cadmium will diffuse to produce a highly conductive eutectic solution having a melting point less than the melting point of both zinc and cadmium. FIG. 3 illustrates the equivalent circuit of a rectangular waveguide as shown in FIG. 1 according to the invention. This circuit shows that the invention does not create any capacitive noise as compared to FIG. 3.

It also is necessary to conduct the joining of the aluminum sheets in a vacuum because it is impossible to clean or remove fluxes or any other contaminants after the alloying process is completed.

Because the alloy bond is initially relatively weak the parts should be fastened together so that the compression forces times the coefficient of friction exceed any force due to difference in thermal coefficients. This process requires a final temperature in excess of 320° C. (If this process is used to fabricate an antenna that is used in aircraft or space environment the total temperature exposure could exceeds 350° C.). The final temperature, the time at temperature, and the cool down rate will be proportional to the size and mass of the work.

A characteristic of high frequency waveguide is that it is usually long in relation to its cross section. This means that condensation inside the guide is an ever present problem because condensation causes corrosion within the waveguide. Therefore, no flux is used in this process because condensation is difficult to remove from the internal surfaces of a long tube. Residual flux plus condensation would be an unacceptable combination because a high corrosion rate within the waveguide would result.

The heating in the vacuum chamber should insure that the residual oxygen gases that may be entrapped as a by-product of the zinc immersion process and the subsequent cadmium plating process are completely removed. (This is why the process requires a vacuum chamber. The pressure in the chamber should be less than $1 \times 10^{-5}$ Torr for best results.) The heating in the vacuum chamber also enables the diffusion of the base material (aluminum) to the joining material (cadmium) to take place without flux. Since the diffusion process takes place at the annealing temperature of the aluminum base material in the vacuum, the crystalline structure of the aluminum is rearranged for the best conductivity at the same time. This process is especially useful in fabricating waveguides because it minimizes noise and propagation losses within the waveguide while maximizing its power handling ability.

Pumping down the system and proper venting of work at a pressure in the $10^{-5}$ Torr range or lower is a preferred feature. The $10^{-5}$ Torr range is necessary, to ensure the removal of trapped gases and water vapor in the surface of the aluminum and those related to the cadmium plating process. This is necessary for the alloying process. Once the cadmium reaches the liquid range, it will start to alloy with the zinc. Once this has taken place, the cadmium zinc alloy will start to diffuse into and alloy with the aluminum alloy.

The work must be cooled down in the vacuum chamber so that excessive oxidation does not take place. It is permissable at temperatures below 200° C. to use an inert gas (nitrogen) to help in the cool down process.

To chemically stabilize the work it should be passivated by pumping the passivating liquid through the ducts and channels.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope if the invention.

What is claimed is:

1. A process for joining surfaces of first and second aluminum members of a high frequency electrical device, said surfaces having an aluminum oxide layer thereon, said process comprising the steps of:
    (a) dissolving and removing completely the aluminum oxide layer from the surface of each of said first and second members to be joined and replacing each of the aluminum oxide layers with a layer consisting essentially of zinc;
    (b) plating at least one of the zinc layers with a non-alloy cadmium;

(c) assembling and retaining together said first and second aluminum members so that the surfaces to be joined are held in contact with one another and placing said aluminum members in a vacuum; and (d) heating the members while in the vacuum thereby forming a bond between said first and second aluminum members.

2. A process as recited in claim 1, wherein said aluminum members consist of aluminum alloys selected from the group of alloy 5005-H34 and alloy 1100-414.

3. A process as recited in claim 1, wherein said step of replacing comprises the following steps:
pre-machining the joining surfaces of aluminum members to be plated;
then performing a caustic dip of said surfaces; and
then placing said dipped surfaces in a zinc immersion bath.

4. A process as recited in claim 3, wherein said zinc immersion bath comprises zinc oxide and sodium hydroxide wherein the concentration of said zinc oxide is 90 grams per liter and the concentration of said sodium hydroxide is 450 grams per liter.

5. The process as recited in claim 1, wherein said cadmium plating is substantially between $4 \times 10^{-4}$ in. and $5 \times 10^{-4}$ in. thick.

6. The process as recited in claim 1, further comprising, prior to said step of assembling and after said step of plating, the steps of:
machining said aluminum members; and cleaning said machined aluminum members.

7. The process as recited in claim 1, wherein said step of heating comprises placing the members in a vacuum having a heating system.

8. The process as recited in claim 7, wherein said heating system is pumped down to $10^{-5}$ torr or less, and wherein said bonding surfaces are heated to a temperature which exceeds 320° C.

9. The process as recited in claim 1, wherein said step of heating comprises heating said members and material until their temperature is at or slightly above the annealing temperature of said members thereby providing the greatest electrical volume conductivity in said members without mechanically distorting said members.

10. The process as recited in claim 1 further comprising the step of reducing the temperature of said members before removing the bonded aluminum members from the vacuum.

11. The process as recited in claim 1, wherein said plating comprises the step of electroplating.

12. The process as recited in claim 1 further comprising the step of passivating said members after said heating step.

13. The product resulting from the process recited in claim 1.

14. A waveguide comprising:
a first aluminum member having a bonded surface comprising a first layer of zinc;
a second aluminum member having a bonded surface comprising a second layer of zinc; and
an interlayer comprising a solution of cadmium and zinc disposed between said first and second layers, and forming a bond between said first and second layers.

15. A high frequency electrical device comprising:
first and second aluminum members each having the aluminum oxide layer on at least one surface thereof replaced with a zinc layer; and
a solution layer comprising cadmium and zinc located between and bonded to the zinc layers whereby the members are bonded together.

16. The device as recited in claim 15, wherein the aluminum sheets consist of aluminum alloys selected from the group of alloy 5005-H34 or alloy 1100-414.

* * * * *

UNITED STATES PATENT AND TRADEMARK OFFICE
CERTIFICATE OF CORRECTION

PATENT NO. : 4,948,031

DATED : August 14, 1990

INVENTOR(S) : Charles E. DeClerck

It is certified that error appears in the above-identified patent and that said Letters Patent is hereby corrected as shown below:

Col. 2, line 36, "boding" should read --bonding--.

Col. 3, line 23, "inventor" should read --invention--.

Col. 4, line 25, "expentancy" should read --expectancy--.

Col. 5, line 36, "decreases" should read --decrease--.

Col. 6, line 2, "exceeds" should read --exceed--.

Col. 6, line 55, "if" should read --of--.

Col. 8, line 35, "sheets" should read --members--.

Signed and Sealed this

Fifth Day of May, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,948,031
DATED : August 14, 1990
INVENTOR(S) : Charles E. DeClerck It is certified that error appears in the above-identified patent and that said Letters Patent is hereby corrected as shown below:

Col. 4, line 60, "(320.9)" should read --(320.9°C)--

Col. 4, line 61, "(231.9)" should read --(231.9°C)--

Col. 4, line 61, "(327.4)" should read --(327.4°C)--

Col. 4, line 61, "(419.4)" should read --(419.4°C)--

Col. 4, line 63, between "plating" and "to" insert --and--

Col. 4, line 63, "avoid" should read --minimize--

Signed and Sealed this

Seventh Day of September, 1993

Attest:

BRUCE LEHMAN

Attesting Officer

Commissioner of Patents and Trademarks